United States Patent [19]

Newman

[11] 4,051,083

[45] Sept. 27, 1977

[54] ELASTOMER BLENDS FOR TIRE COMPONENTS

[75] Inventor: Neil F. Newman, Edison, N.J.

[73] Assignee: Exxon Research & Engineering Co., Linden, N.J.

[21] Appl. No.: 601,076

[22] Filed: Aug. 1, 1975

Related U.S. Application Data

[63] Continuation-in-part of Ser. No. 444,313, Feb. 21, 1974, abandoned.

[51] Int. Cl.² .......................... C08L 7/00; C08L 9/06
[52] U.S. Cl. ................................ 260/5; 152/353 R; 260/889
[58] Field of Search ................ 260/5, 889; 152/353 R

[56] References Cited

U.S. PATENT DOCUMENTS

| | | | |
|---|---|---|---|
| 3,454,462 | 7/1969 | Hawley | 260/889 |
| 3,505,190 | 4/1970 | Morrissey | 260/889 |
| 3,704,741 | 12/1972 | Turk | 260/5 |
| 3,915,907 | 10/1975 | Hopper | 260/889 |

*Primary Examiner*—John C. Bleutge
*Attorney, Agent, or Firm*—John J. Mahon

[57] ABSTRACT

Tire flexing components having improved ozone and flex and weather resistance are prepared by blending a general purpose rubber with a chlorinated EPDM containing about 0.1 to about 0.9 wt. % chlorine. The products so formed are useful for tire components that are subject to severe flexing such as coverstrips and sidewalls.

9 Claims, No Drawings

ELASTOMER BLENDS FOR TIRE COMPONENTS

CROSS-REFERENCE

This application is a continuation-in-part of Ser. No. 444,313, filed Feb. 21, 1974 now abandoned.

BACKGROUND OF THE INVENTION

General purpose rubbers are employed in the manufacture of a wide variety of rubber articles including automotive tires. The term "general purpose rubber" as used in the specification and claims means the highly unsaturated rubbers of commerce illustrative of which are styrene butadiene rubber (SBR), polyisoprene, polybutadiene, natural rubber, etc. While these rubbers exhibit excellent physical properties in their vulcanized state, they are subject to attack by elemental oxygen, especially ozone. The resistance to oxidation and oxidative degeneration may be improved by the addition of an antioxidant or antiozonant at a concomitant increased cost in the rubber product.

It is well known in the art to improve the ozone resistance of such general purpose rubbers by blending the general purpose rubber (GPR) with an EPDM terpolymer. See, for example, U.S. Pat. No. 3,492,371, incorporated herein by reference.

It has been found that the EPDM rubber may be made more compatible with the GPR by brominating the EPDM. See, for example, U.S. Pat. No. 3,524,826, incorporated herein by reference. The disclosures of that patent teach that a requirement for operability of the invention is that the EPDM contain at least one wt. % bromine. The blends so formed have improved ozone resistance in addition to outstanding physical properties.

Heretofore, although compositions of GPR and EPDM demonstrated improved ozone resistance, they were lacking in flex properties and therefore had limited application in tire flexing components.

SUMMARY OF THE INVENTION

It has surprisingly been discovered that tire sidewalls and coverstrips having superior ozone, flex and weather resistance can be prepared from vulcanizates based on binary blends of 70–75 wt. % of a general purpose rubber and 25–30% of a halogenated EPDM.

The compositions so formed have excellent tensile strengths. These compositions are non-staining and do not require costly antidegradants for stability.

DETAILED DESCRIPTION

This invention relates to a method for improving the flex, ozone and weather resistance of general purpose rubbers. In particular, this invention relates to a blend of general purpose rubbers comprising about 70–75% of a general purpose rubber and 25–30 wt. % of a halogenated EPDM. The term "EPDM" as used in the specification and claims is used in the sense of its definition as found in ASTM D-1418-64, and is intended to mean a terpolymer containing ethylene and propylene in the backbone and diene enchainment with residual unsaturation in the sidechains. Illustrative methods for producing these terpolymers are found in U.S. Pat. No. 3,280,082, British Pat. No. 1,030,989 and French Pat. No. 1,386,600.

The term "tire flexing component" as used in the specification and claims means automotive or truck tire sidewalls, coverstrips or treads.

The preferred polymers contain about 45 to abut 80 wt. % ethylene and about 2 to about 10 wt. % diene monomer. The balance of the polymer is propylene. Preferably, the polymer contains 50 to 60 wt. % ethylene, e.g., 56 wt. %, and about 2.6 to 4 wt. % diene monomer, e.g., 3.3 wt. %. The diene monomer is a non-conjugated diene. Illustrative of these non-conjugated diene monomers which may be used in the terpolymer (EPDM) are hexadiene, dicyclopentadiene, ethylidene norbornene, methylene norbornene, propylidene norbornene and methyltetrahydroindene. A typical EPDM is Vistalon 3509 (Exxon Chemical Company, U.S.A.), a polymer having a Mooney Viscosity at 212° F. of about 90 prepared from a monomer blend having an ethylene content of about 56 wt. % and a non-conjugated diene content (methylene norbornene) of about 2.6 wt. %. Typical of an EPDM containing ethylidene norbornene as a diene monomer is Vistalon 4608 (Exxon Chemical Company, U.S.A.), a polymer having a Mooney Viscosity at 260° F. of about 62, and an ethylene content of about 56 wt. %.

Methods for preparing halogenated EPDM are well known in the art. The halogenated polymers may be prepared by reacting an EPDM consisting of ethylene, an alpha-olefin other than ethylene, and a small amount of non-conjugated diolefin with a halogen or halogens, such as chlorine or bromine in a chlorinated hydrocarbon such as carbon tetrachloride, chloroform, trichloroethylene, tetrachloroethylene, or monochlorobenzene in the presence or absence of a free radical initiator, e.g., UV light or chemical initiators, etc. When a mixture of chlorine and bromine is used, usually bromination is effected first and chlorination follows.

Illustrative of chlorinated EPDM is chlorinated Vistalon 6505 (Exxon Chemical Company, U.S.A.) having the following properties: ethylene content, 48 wt. %; ethylene norbornene content, 9 wt. %; and a chlorine content of 0.65 wt. %. The polymer has an iodine number of 18.6 and a Mooney Viscosity ML 260 of 67.

The chlorinated EPDM usefuul in the practice of this invention contains about 0.1 to bout 0.9 wt. % chlorine, more preferably about 0.3 to about 0.7 wt. % chlorine, with optimum results being observed in the 0.55 to 0.65 wt. % chlorine range.

The chlorinated EPDM blends of this invention comprise at least 25 parts per hundred by weight of chlorinated EPDM based on the general purpose rubber. Preferably, the composition comprises about 25 to about 40 phr chlorinated EPDM; more preferably about 25 to about 35 phr; most preferably about 25 to about 30 phr.

Preferred highly unsaturated rubbers for use in the blends of this invention are styrene-butadiene rubber, polybutadiene rubber and natural rubber and blends of same, particularly blends comprising 25 to 75% by weight of natural rubber with the balance being styrene-butadiene rubber or polybutadiene rubber.

The advantages of the instant invention may be more readily appreciated by reference to the following examples.

EXAMPLE 1 — Halogenation of EPDM

A. Typical Solution Halogenation Procedure

A 5-l round bottom flask was fitted with stirrer, condenser, thermometer, and a temperature controller. Normal heptane (3 l) was placed into the flask and heated to 80° C. EPDM (150 g) was cut into small pieces, placed into the flask, and stirred for 6–24 hours until completely dissolved. N-halosuccinimide and 0.20 g of benzoyl peroxide were added and the mixture was stirred for 4–33 hours to effect the halogenation. The mixture was cooled to ambient temperature and the insoluble by-products allowed to settle. The solution was decanted into a separating funnel and the polymer was precipitated by slowly adding the heptane solution to 2 volumes of vigorously stirring acetone. After drying to constant weight under vaccum at 40° C., Ca. 146 g of polymer was recovered.

B. Typical Neat Halogenation Procedure

EPDM (100 g), 1,3-dihalo-5,5-dimethylhydantoin (DMH) and (optionally) 0.5 g of benzoyl peroxide were thoroughly blended on a cool rubber mill. The amount of DMH was chosen such that the theoretical amount of reactive halogen was 0.5–1.0 g. The mixture was then heated between mylar sheets in a hydraulic press at 320° F. for 20 minutes to effect the halogenation.

EXAMPLE 2 — Polymers Prepared Via Solution Chlorination

Various ethylene-propylene-diene monomer polymers were chlorinated by the solution methods set forth in Example 1 using N-chlorosuccinimide as the chlorinating agent. The results are shown in Table I.

TABLE I

| EPDM | Chlorinating Agent | Reaction Time, hrs. | Wt. % Halogen | ML-260 | Iodine Number | I.V. |
|---|---|---|---|---|---|---|
| V-4608 | 25 g NCS | 24 | 0.26 | 94 | 7.2 | 2.4 |
| V-4608 | 40 g NCS | 17 | 0.93 | 146 | 3.2 | 3.6 |
| V-6505 | 40 g NCS | 5 | 0.33 | 66 | 18.4 | 2.4 |
| V-6505 | 25 g NCS | 24 | 0.63 | 67 | 18.6 | 2.5 |

NCS = N-Chlorosuccinimide

EXAMPLE 3

Various blends of general purpose rubber were prepared using EPDM, chloro-EPDM and halogenated butyl rubber in an effort to improve the physical properties of the general purpose rubber. All the vulcanizates described in this example were press cured for 30 minutes at 307° F. Formulations used in this example are as follows:

| Component | Parts per hundred |
|---|---|
| Elastomer as shown | 50 |
| Carbon Black (FEF) | 50 |
| Plasticizer (Flexon 580 oil) | 12 |
| Sunolite 127 wax | 1.5 |
| Stearic acid | 1 |
| Zinc oxide | 3 |
| Sulfur | 0.4 |
| Mercaptobenzothiazyl-disulfide (MBTS) | 0.6 |
| Alkylphenol polysulfide (Vultac #5) | 2.0 |

TABLE II

| CHLORINATED VISTALON-6505 IN A BLACK COVERSTRIP FORMULATION | | | | | |
|---|---|---|---|---|---|
| | 1 | 2 | 3 | 4 | 5 |
| CHLORO-EPDM[1] | 25 | 30 | | | |
| V-6505 | | | 25 | 12.5 | 22.5 |
| HT-1068[2] | | | | 12.5 | 22.5 |
| RSS #1[3] | 45 | 42 | 45 | 45 | 33 |
| SBR-1500[4] | 30 | 28 | 30 | 30 | 22 |
| Shore A | 51 | 55 | 51 | 54 | 60 |
| 300% Modulus, psi | 780 | 940 | 750 | 1050 | 1350 |
| Tensile Strength, psi | 2010 | 1930 | 1690 | 1980 | 1860 |
| Elongation, % | 610 | 590 | 580 | 510 | 410 |
| 50 pphm O$_3$, 100° F. | | | | | |
| $\sigma_c$(Ter/typ), psi | 152/159 | ~173/>181 | 60/63 | 48/58 | ~196/>213 |
| $\epsilon_c$(Ter/typ), % | 200/226 | ~260/>299 | 52/56 | 33/43 | ~192/>241 |
| $\omega^c$(Ter/typ), psi | 176/207 | ~260/>309 | 17/20 | 8.5/14 | ~221/>295 |
| E, psi | 233 | 239 | 177 | 195 | 302 |
| 50 pphm O$_3$, 100° F. o-30% extension | | | | | |
| Hours to fail | >300 | >300 | <4 | 4 | >300 |
| Fatigue-to-Failure, 0–100% extension | | | | | |
| Kilocycles to fail (Japanese Industrial Standard), avg. | 81 | 71 | 46 | 69 | 77 |
| Goodrich Flex; 100° C., 15# load, ¼" stroke | | | | | |
| Minutes to rupture | 11 | — | 6.5 | 6 | — |
| Outdoor Dynamic Weathering | | | | | |
| Hours to fail | 280 | — | <24 | <24 | 280 |

Notes:
[1] Chlorinated Vistalon 6505 prepared by the method of Example 2 containing 0.63% chlorine.
[2] Chlorinated butyl rubber having a Mooney Viscosity (ML, 1+3) at 260° F. of 50–60, a viscosity average molcular weight of about 450,000 and 1.3 wt. % chlorine.
[3] Ribbed smoked sheet - natural rubber.
[4] Emulsion polymerized styrene-butadiene copolymer comprising about 24% styrene having a Mooney Viscosity of about 52 (ML, 1+4) at 212° F.

EXAMPLE 4

Various compositions were prepared in a sidewall formulation. The samples were press cured for 30 minutes at 307° F. The formulation used in the example was as follows:

| Component | Parts per hundred |
|---|---|
| Elastomers as shown | |
| Carbon Black (GPF) | 60 |
| Flexon 580 Plasticizer Oil | 30 |
| Stearic acid | 2 |
| Zinc oxide | 3 |
| Sulfur | 0.8 |
| MBTS | 0.8 |
| Vultac #5 | 1.5 |

TABLE III

CHLORINATED VISTALON-6505 IN A WHOLE SIDEWALL FORMULATION

| | 6 | 7 | 8 | 9 | 10 |
|---|---|---|---|---|---|
| CHLORO-EPDM (same as Table II) | 25 | 30 | 25 | 17.5 | 22.5 |
| V-6505 | | | | 17.5 | 22.5 |
| HT-1068 | | | | | |
| Rss #1 | 37.5 | 35 | 37.5 | 32.5 | 27.5 |
| SBR-1500 | 37.5 | 35 | 37.5 | 32.5 | 27.5 |
| Shore A | 49 | 49 | 48 | 49 | 49 |
| 300% Modulus, psi | 550 | 590 | 620 | 710 | 790 |
| Tensile Strength, psi | 1470 | 1590 | 1380 | 1480 | 1500 |
| Elongation, % | 680 | 680 | 600 | 590 | 550 |
| 50 phm $O_3$, 100° F. | | | | | |
| $\sigma_c$(Ter/typ), psi | 109/>134 | 105/~139 | 38/47 | 58/70 | 169/~181 |
| $\epsilon_c$(Ter/typ), % | 165/>348 | 167/~323 | 38/51 | 53/72 | 251/~320 |
| $\omega_c$(Ter/typ), psi | 104/>266 | 113/~256 | 7.7/14 | 17/28 | 244/~331 |
| E, psi | 174 | 182 | 139 | 167 | 235 |
| Fatigue-to-Failure, 0-100% extension | | | | | |
| Kilocycles to fail (Japanese Industrial Standard), avg. | 102 | 107 | 70 | 84 | 98 |
| Outdoor Dynamic Weathering | | | | | |
| Hours to fail | 132 | >280 | <24 | 36 | 250 |

Run 5 of Table II and Run 10 of Table III show the current state of the art in that in order to achieve the outstanding properties shown, 45 phr of specialty elastomer is required. The composition of this invention of the other hand (Runs 1, 2, 6 and 7) requires only 25-30 phr to achieve the same results, resulting in obvious economics.

In the tabulated data set forth above, the most significant property for evaluation of ozone resistance is $\omega_c$ (Ter/typ), psi, the critical stored energy density. When a comparison is made, for example, of the values given in Runs 1 and 2, which are examples of the invention, with Runs 3 and 4 which are comparative examples using approximately the same amounts of specialty elastomers, the improvement is readily apparent. The values for Runs 3 and 4 would be unacceptable and these compositions would be unsuitable for commercial tire components. The effectiveness of the compositions of the present invention is brought out by comparison with Run No. 5 where twice as much specialty elastomer is required to achieve acceptable ozone and weather resistance values. The same comparisons and conclusions are evident from a review of Table III.

What is claimed is:

1. A method for improving the weather resistance, flex and ozone resistance of tire flexing components prepared from blends of highly unsaturated rubbers, said blends comprising 25 to 75% by weight of natural rubber, the balance of said blends being styrene-butadiene rubber or polybutadiene rubber, which comprises incorporating into the tire flexing composition about 25 to about 40 parts per hundred based on the highly unsaturated rubber blend of a chlorinated EPDM containing 0.1 to 0.9 weight % chlorine.

2. The method of claim 1 wherein the chlorinated EPDM is incorporated into the composition at about 25 to about 35 phr.

3. The method of claim 3 wherein the chlorinated EPDM is incorporated into the composition at about 25 to about 30 phr.

4. The method of claim 1 wherein the chlorinated EPDM contains about 0.3 to about 0.7 weight % chlorine.

5. The method of claim 1 wherein the chlorinated EPDM contains about 0.55 to about 0.65 weight % chlorine.

6. The method of claim 1 wherein the tire flexing component is an automobile tire sidewall.

7. The method of claim 1 wherein the tire flexing component is an automobile tire coverstrip.

8. The method of claim 1 wherein the blend comprises natural rubber and styrene-butadiene rubber.

9. The method of claim 8 wherein the chlorinated EPDM contains about 0.55 to about 0.65 weight % chlorine.

* * * * *

UNITED STATES PATENT OFFICE
CERTIFICATE OF CORRECTION

PATENT NO. : 4,051,083
DATED : September 27, 1977
INVENTOR(S) : Neil F. Newman

It is certified that error appears in the above—identified patent and that said Letters Patent are hereby corrected as shown below:

In the claims, column 6, line 30, after the phrase "3. The method of claim", change "3" to --1--.

Signed and Sealed this

Twenty-first Day of March 1978

[SEAL]

Attest:

RUTH C. MASON
Attesting Officer

LUTRELLE F. PARKER
Acting Commissioner of Patents and Trademarks